United States Patent [19]

Sairanen

[11] 4,456,855
[45] Jun. 26, 1984

[54] INTENSITY REGULATOR, ESPECIALLY A LIGHT REGULATOR

[75] Inventor: Martti Sairanen, Vantaa, Finland

[73] Assignee: Oy Helvar, Helsinki, Finland

[21] Appl. No.: 381,145

[22] Filed: May 24, 1982

[30] Foreign Application Priority Data

Jun. 15, 1981 [FI] Finland .................................. 811867

[51] Int. Cl.³ .......................... G05F 1/00; H05B 37/02
[52] U.S. Cl. .................................... 315/308; 315/208; 315/247; 315/287; 315/DIG. 4
[58] Field of Search .................. 315/307, 308, DIG. 4, 315/247, 208, 287

[56] References Cited

U.S. PATENT DOCUMENTS

| | | | |
|---|---|---|---|
| 4,076,996 | 2/1978 | Maehara et al. | 315/308 |
| 4,220,896 | 9/1980 | Paice | 315/307 |
| 4,277,728 | 7/1981 | Stevens | 315/308 |
| 4,356,433 | 10/1982 | Linden | 315/208 |

*Primary Examiner*—Harold Dixon
*Attorney, Agent, or Firm*—Zarley, McKee, Thomte, Voorhees & Sease

[57] ABSTRACT

Intensity regulator, especially a light regulator which can be adapted to the regulation of the light intensity of both compensated and uncompensated illuminators connected to the alternating-current mains. The regulator comprises one or more switch elements (S1, S2) disposed in a circuit between the mains and an illuminator (L) as well as a control logic circuit (4) for the switch element or elements, said circuit upon the intensity regulation breaking the supply current at least once on each half-cycle when current has been conducted from the O-moment of a half-cycle to the moment according to a set value. On one hand, a problem is the elimination of current peaks produced by voltage differences at a switch-on moment and, on the other hand, the arrangement of a control for the switch elements. To overcome the problem, the switch element (S1) is a double-switch two-way switch element connected in series with a load (L) and controlled on each half-cycle to break the current only from the mains towards the load but to permit the current flow in the opposite direction. The other two-way switch element (S2) is coupled parallel to load (L) and controlled on each half-cycle to block the current flow in the direction of the mains voltage but to permit the oppositely directed current flow therethrough. In order to determine the current breaking moment of the switches of the first switch element (S1), the control logic circuit is provided with an integrator, a mains voltage O-moment sensor and reference voltage setting means, whereby from the O-moment of the mains voltage, with the integrated voltage reaching a set reference voltage, the integrator provides a control data to a comparator logic for breaking the current of switch element (S1) in said direction.

8 Claims, 12 Drawing Figures

I. SUBCOMPENSATED ILLUMINATOR
II. COMPENSATED ILLUMINATOR
III. OVERCOMPENSATED ILLUMINATOR

REGULATION-DEPENDANT CONTROL

INTENSITY REGULATOR, ESPECIALLY A LIGHT REGULATOR

A substantial number of illuminators which employ discharge lamps are compensated by capacitors, one capacitor for each illuminator. Discharge lamps behave like an inductive load, as their application without compensation results in substantial fluorescence power flows. Said flows cause additional expenses in the form of fluorescence power fees. Cables leading to uncompensated illuminators must be dimensioned according to currents that are substantially greater than necessary for compensated illuminators.

Because of the capacitance of a compensation capacitor, it has not been heretofore possible to control the compensated illuminators by means of electronic light regulators. With conventional regulators, triggering of a switch element during the course of a half-cycle of the mains voltage has led to the failure or at least disturbed operation of an apparatus as a result of the surge currents adopted by compensation capacitors.

One solution has already been proposed (DOS publication No. 26 44 553) in which effort is made to conduct the current from the beginning of a half-cyle to the switch-off moment according to a set value.

This prior art as the basis, an object of the present invention is an intersity regulator, especially a light regulator which is suitable for the regulation of the light intensity of both compensated and uncompensated illuminators connected to an alternating-current mains, said regulator having one or a plurality of switch elements fitted in a circuit between the mains and the illuminator, as well as a control circuit for a switch element or elements which in the course of the regulation intensity switches off the supply current at least once on each half-cycle when the current has been conducted from the O-moment of a half-cycle to the moment according to a set value.

However, the practical embodiment of this principle has been prevented by several problems, due to e.g. various compensation degrees of a load. When loading is sufficiently compensated, the voltage of a loading may decrease slower than the mains voltage. Thus, energy should be transferable from the loading towards the mains, so that a voltage difference between the mains and the loading would remain small.

When the compensation degree of a loading is low, after the flowward break effected by the switch element, the voltage of a loading tends to turn complementary to the mains voltage while an inductive load picks up its current from the compensation capacitor. With a low degree of compensation, this complementary voltage increase to such an extent that the switch elements would be destroyed unless the event is prevented.

To overcome these problems, a light regulator of the invention is characterized in that a switch element is a two-way switch element connected in series with a load and controlled on each half-cycle so as to switch off the current only from the mains towards the load but to permit the current flow in the opposite direction, and that another similar switch element is connected parallel to the load between said load and the first switch element. Although the load is clearly overcompensated, voltage of the load cannot substantially exceed the mains voltage for the reason that the energy of a compensation capacitor discharges automatically into the mains through the first two-way switch element.

With this regulator of the invention, it is also possible to keep the load voltage of a loading having a low compensation degree near zero in case the voltage of the load tends to turn complementary to the mains voltage since, in this situation, the second switch element begins to pass current to a lamp. Thus, with the flowward control of the first, in series with the load connected switch element being switched on, no current peak is developed by virtue of a small voltage difference between the mains and the load.

The following advantages are gained with the regulation of various lamp types by using the second switch. Fluorescence of 38 mm diameter are regulated with the use of glow transformers the same way as with a conventional regulator without compensation regardless of a degree of compensation. Ignition circuited 38 mm fluorescence lamps are regulated regardless of a degree of compensation better than with a conventional regulator without compensation.

Fluorescence lamps of 26 mm diameter are not at all reliably regulable by means of a conventional regulator. By using a regulator according to the present invention those with an ignition circuit can be regulated regardless of a degree of compensation.

Mercury vapour lamps can be regulated by the novel regulator regardless of a degree of compensation more effectively than by means of a conventional regulator without compensation.

Sodium lamps, the same way as mercury vapour lamps, are regulated better than by using a conventional regulator. Both of these lamp types can be regulated to a lower level than by using a conventional regulator. Regulation downwards can also be effected essentially quicker than with a conventional regulator.

The improvement of regulation characteristics is largely due to the fact that, when power supply from the mains to the lamp is cut off, a current to the lamp is not cut off but it is possible to utilize the energy of a compensation capacitor and choke, the currentless time of a lamp being shorter than conventionally which substantially improves the regulation characteristics of a lamp e.g. by decreasing the re-ignition voltage.

Another problem to be resolved is the timing of the control of the switch-off moment of a switch element connected in series with the load. A solution that can be considered conventional to a skilled person is a regulation based on time measurement for the control of said timing.

An object of the invention is also to find a more simple and practical solution for the timing of the control of said switch element. According to the invention, for the determination of the circuit breaking moment of the switches of a switch element a control logic circuit is provided with an integrator, a sensor for detecting the O-moment of the mains voltage and a reference voltage setting device, whereby from the O-moment of the mains voltage, with the integrated voltage reaching the set reference voltage, the integrator provides a control data for the comparator logic in order to break the current of said switch element in said direction (from the mains towards the load). By virtue of this integrator principle the switch-off takes place with a higher mains voltage earlier than with low voltage, so the variations of the mains voltage have substantially less effect on the intensity of the lamps than by using a regulation based on time measurement. Furthermore, the integration principle tends to symmetrize the load current.

In the following some embodiments of the invention are described further with reference to the accompanying drawings in which.

Figure 1:
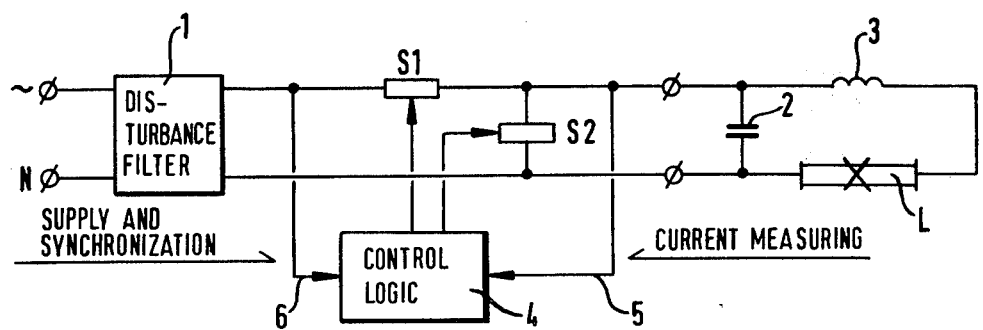
FIG. 1 is a diagram showing the principle of a regulator of the invention.

FIG. 1 illustrates the adaptation of a light regulator according to the invention to the control of the light intensity of a fluorescence lamp L. The fluorescence lamp L is connected via a disturbance filter 1 to the alternating-current mains. Reference numeral 3 designates in inductance formed e.g. by a coil which limits the current of lamp L. For limiting the fluorescence power the circuit has coupled therein a compensation capacitor 2 for each illuminator.

Figure 2:
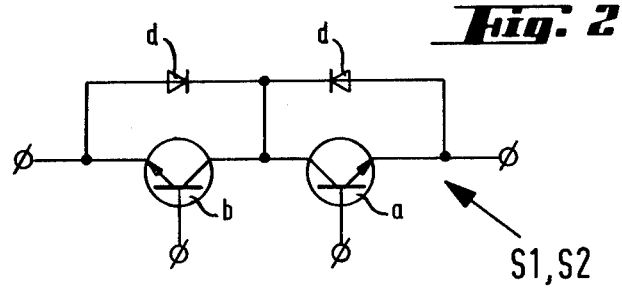
FIG. 2 shows one preferred embodiment of switch elements S1 and S2 used in the regulator of FIG. 1.
Figure 8:
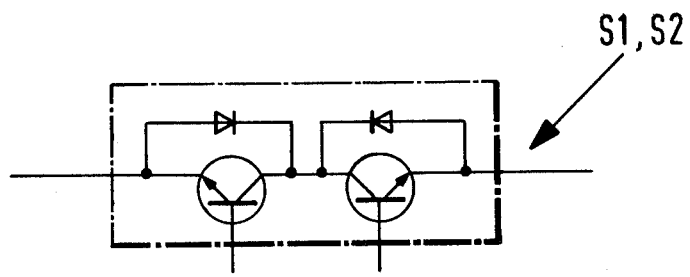
FIGS. 8–12 show alternative embodiments of a switch element illustrated in FIG. 2.

A regulator according to the invention comprises a first switch S1 connected in series with illuminator L. A second switch S2 is coupled parallel with load L between said load and the first switch element S1. A control logic 4, to be described in more detail hereinbelow with reference to FIG. 4, controls the switches of switch elements S1 and S2 consisting in the example of FIG. 2 of two transistors a and b whose collectors are coupled together. Thus, the transistors can be connected on the same cooling plate without insulation. Such a switch element can be embodied by integrating transistors a and b into one solid state component. Parallel to each transistor are coupled relatively reversed diodes d whose discharge direction is from emitter to collector of a transistor parallel therewith. In the event of an integrated component, the diodes can be integrated in corresponding transistors, as illustrated in the alternative of FIG. 8.

The control logic circuit 4 receives its supply and synchronization from the mains current as depicted by an arrow 6. Arrow 5 illustrates a current limiting control used to cut off the control from switch elements S1 and S2 until the following O-moment of the mains voltage in case the loading current of a switch element exceeds a permitted value.

Figure 3:
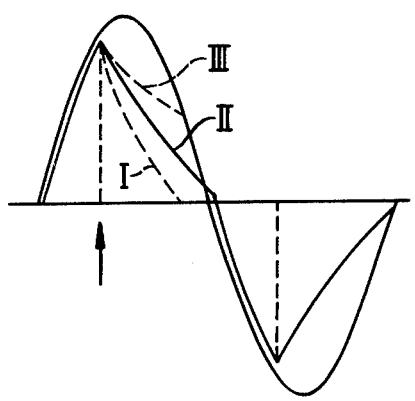
FIG. 3 shows the curved shape of the input and output voltage of a regulator of the invention.

The curve of FIG. 3 illustrates the general working principle of a regulator. The curve shape of the regulator input voltage is sine-shaped. The output voltage increases with a corresponding curve shape from the O-moment of the voltage until a desired circuit breaking moment is reached. Then the switch a of switch element S1, which has heretofore been closed, is opened while switch b still remains closed. Thus, a forward current flow, i.e. current from mains to load, is cut off and the output voltage of a regulator begins to fall depending on a degree of compensation of the load according to various alternative of which FIG. 3 illustrates the followings: I a subcompensated illuminator, II a compensated illuminator and III an overcompensated illuminator.

However, through a diode d coupled parallel to switch b and switch a there will remain an automatic power feedback possibility from load to mains in case the load voltage tends to outgrow the mains voltage.

Figure 4:
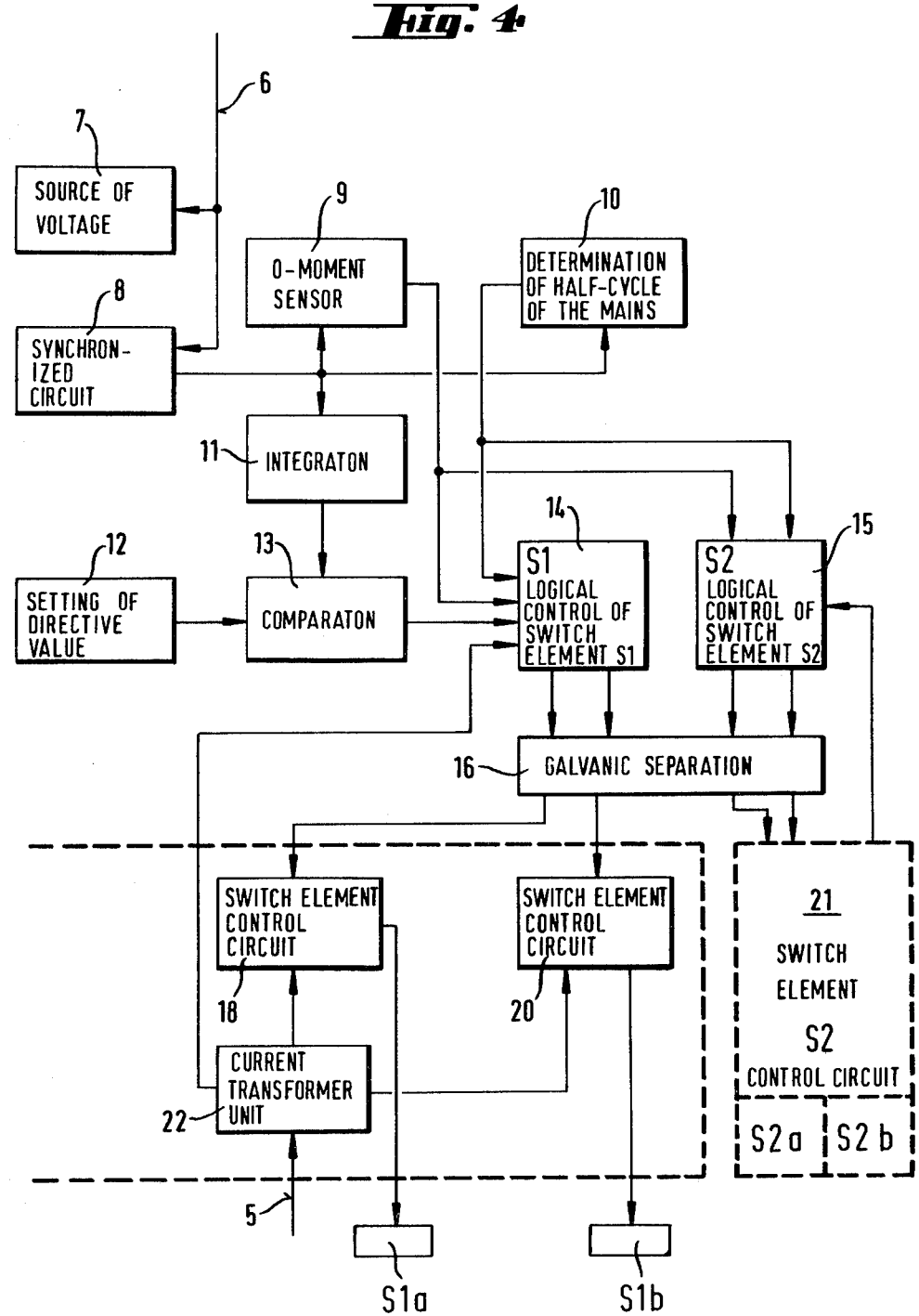
FIG. 4 is a block diagram of the control of the switch elements of a regulator according to the invention.

An essential part of the invention is also a control logic circuit 4 of switches S1 and S2, said circuit being now explained with reference to FIG. 4.

The regulator builds a service voltage required by control electronics from a mains current supply 6 by means of its own source of power 7.

In order to follow the mains voltage, the device is provided with a synchronizing circuit 8. By means of a O-moment sensor a data is formed on the O-moment of the mains voltage. The circuit is further provided with a means 10 for following the polarity of the mains voltage.

In order to determine the circuit breaking moments of the control of switch element S1, a mains voltage following integral function is formed in an integrator 11. Integration is started at the O-momemt of the mains voltage. When the integrated voltage reaches a reference voltage set by e.g. by a potentiometer 12, a comparator 13 provides a logic data for the opening of switch a of switch a of switch element S1 for blocking the current flow from mains to load. By virtue of the integrator principle, the cut off takes place on a higher mains voltage earlier than on low voltage, so variations in the mains voltage have substantially less effect on the intensity of the lamps than in the cases where normal time measurement-based regulation is used.

On the basis of the zero data of mains voltage, the polarity thereof and the switch-off data provided by comparator 13, the logical circuits 14 are used to provide logical control signals for the switches of switch element S1. The logical circuits 15 are used to form on the basis of the zero data and polarity of the mains voltage logical control signals for controlling the switch elements of switch S2. The control signals can be timed in three alternative manners which are described later with reference to FIGS. 5–7.

The control signals are separated galvanically from the mains voltage in a unit 16. After the galvanic separation the logical data is converted into a control current for the switches a and b of switch elements S1 and S2 in control circuits 18 and 20. Some of the control current required by circuits 18 and 20 is picked up from the source of voltage 7. However, the major part of the control current is produced by means of a current transformer unit 22 return coupled from the main circuit (see FIG. 1 arrow 5). Thus, the control current of switch element S1 can be increased according to the loading current. Hence, with a low loading current it is possible to eliminate extra power consumption in the control circuit. In addition, when operating with high currents the current resistivity of switch transistors is improved, as the base current of a transistor can be increased according to the loading current.

A similar control arrangement can be provided for the switches a and b of switch element S2, said control arrangement being generally designated by reference numeral 21.

Figure 5:
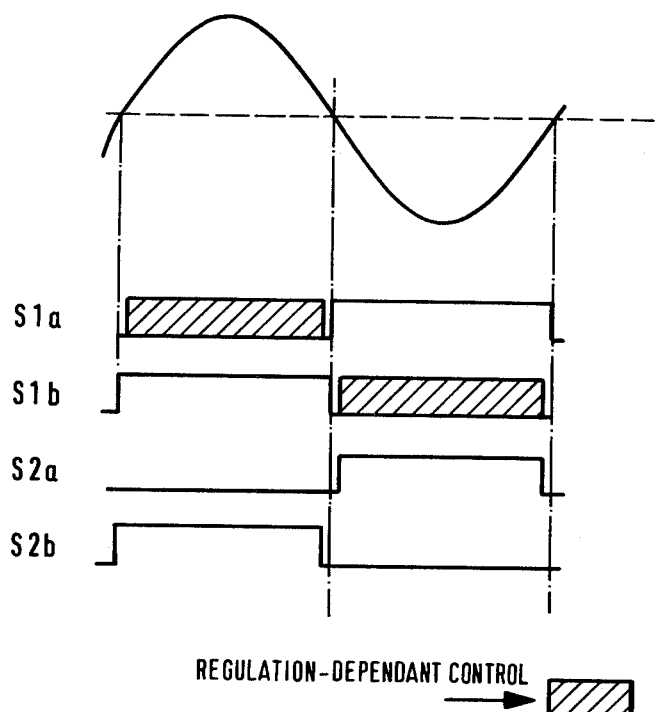
FIG. 5 shows a first alternative for the timing of the switch elements of a regulator according to the invention.

FIG. 5 shows a first alternative for the control of switches a and b of switch elements S1 and S2. A crosslines area illustrates a control that depends on the regulation. The upper line illustrates the closed position of a switch and the lower line the open position. As of the O-moment of the mains voltage onwards, switch S1b is closed and switch S1a will be closed after a small phase angle from the O-moment. At a certain current switch-off moment, switch S1a is opened while switch S1b still remains closed, this situation lasting until the following O-moment of the mains voltage. The situation is now repeated otherwise the same way but functionally the switches a and b have reversed their positions. It is further noted that a control depending on the regulation of switches a and b is stopped and started at a distance of small phase angle from the O-point of the mains voltage. Control of the switches a and b of switch S2 is only effected as depending on the mains voltage in a manner that the current cannot move in the mains voltage's direction of action but is capable of moving in the opposite direction if, after the floward switch-off of switch element S1, the voltage reverses with respect to the mains voltage. Thus, the switch element S2 keeps the load voltage after the current switch-off near zero by conducting current to a lamp L is the load voltage is opposite to the mains voltage. Hence, this is a way of preventing the development of voltage peaks detrimental to the components and of utilizing all power either to a lamp L or back into the supply mains.

It can be further noted from FIG. 5 that both switches a and b of switch element S2 are momentarily opened on either side of the O-point of the mains voltage corresponding to that phase angle on which the switches a and b of switch element S2 do not have a regulation-dependant control.

Figure 6:
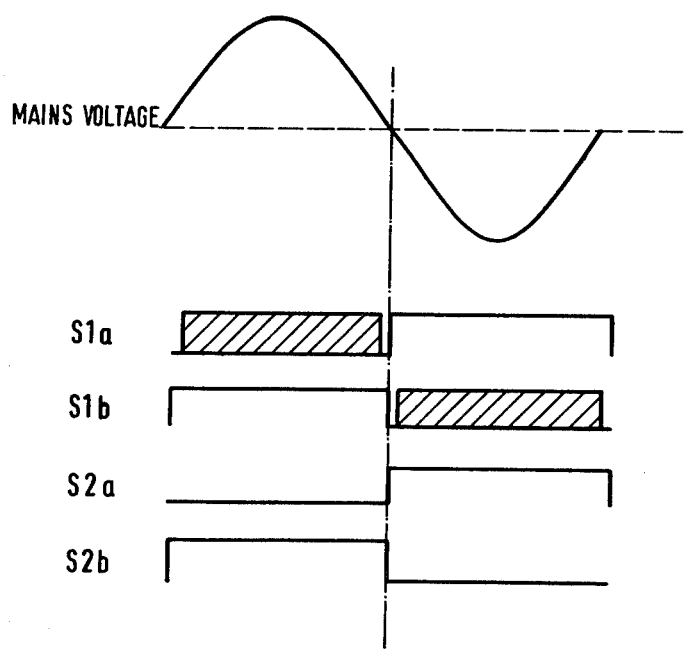
FIG. 6 shows a second alternative for the timing of the control of said switch elements and FIG. 7 is a third alternative for the timing of the control of said switch elements.

However, conversion of the state of switches a and b of switch element S2 can also be timed exactly to the O-point of the mains voltage, as depicted in FIG. 6. Otherwise the control corresponds to FIG. 5.

Figure 7:
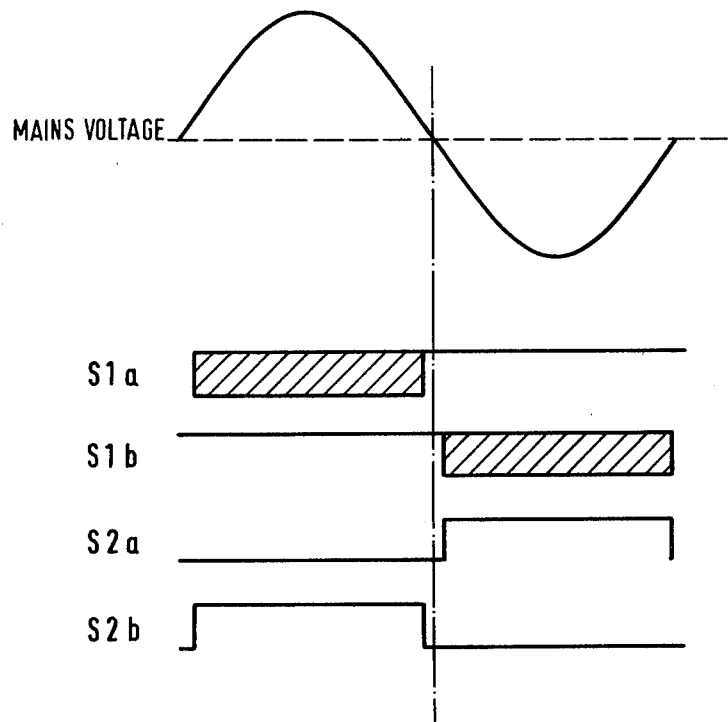

The control illustrated in FIG. 7 differs from that of FIG. 5 in that, as of the O-moment of the mains voltage or even slightly before that, both switches a and b of switch element S2 are closed until during a regulation-dependant control a given flow-directed switch a or b is opened.

To prevent damage to the switch elements in short-circuit situations, a current transformer is used to produce from their loading current a signal and when that signal exceeds a permitted value, the associated switch element is cut off of control until at least the next O-point of the mains voltage (current limiting control in FIG. 1).

The basic mode of operating switch elements S1 and S2 is that energy is conducted through switch element S1 to the load as from O-point of the mains voltage until the integrator 11 of the control circuit reaches a set value.

When the loading is sufficiently compensated, the load voltage may fall more slowly than the mains voltage (note the overcompensated curve III in FIG. 3). Then the switch element S1 starts to conduct, so that energy tends to move from the load towards the mains. Thus the voltage difference between the mains and the load stays small.

When the degree of compensation of the loading is low (note curve I in FIG. 3), the load voltage tends to turn opposite to the mains voltage after the flow-directed switch-off of switch element S1 while the inductive load picks up its current from the compensation capacitor 2. With a low degree of compensation, the voltage may rise so high that the switch elements would be destroyed unless the event is prevented. According to the invention this is prevented by means of a switch element S2 which starts to conduct current to a lamp if the load voltage is of opposite direction with respect to the mains voltage.

Thus, at the flow-directed switch-on moment of the switch element S1, by virtue of a small voltage difference, no high current peak can be developed.

Although the invention has been described here as a regulator of the intensity of discharge lamps compensated to various degrees, it is excellent and easy to adapt also to the regulation of incandescent lamps as well as to the regulation of the intensity of various capacitive, inductive and resistive loads.

I claim:

1. Intensity regulator, especially a light regulator suitable for the regulation of light intensity of both compensated and uncompensated illuminators connected to the alternating-current mains, said regulator comprising one or more switch elements disposed in a circuit between the mains and the illuminator, as well as a control circuit for the switch element or elements which upon the regulation of intensity breaks the supply current at least once on each half-cycle when current has been conducted from the O-moment of a half-cycle until the moment of a desired set value, characterized in that a switch element (S1) is a two-way switch element connected in series with a load (L) and controlled on each half-cycle to break the current only from the mains towards the load but to permit the current flow in the opposite direction, and that another two-way switch element (S2) is coupled parallel to load (L) and controlled on each half-cycle to block the mains voltage directed current flow but to permit the oppositely directed current flow through said second switch element (S2).

2. An intensity regulator as set forth in claim 1, characterized in that for the determination the current breaking moment of switch element (S1) a control logic circuit (FIG. 4) is provided with an integrator (11), the mains voltage O-moment sensor (9) and a reference voltage setting means (12), whereby as from the O-moment of the mains voltage, with the integrated voltage reaching a set reference voltage, said integrator (11) provides a control data for a comparator logic (13,14) for breaking the current of switch element (S1) in said direction.

3. A light regulator as set foth in claim 1 or 2, characterized in that the regulation-dependant control of on each-half cycle controlled switch (a or b) of switch element (S1) connected in series with load (L) is started at a small phase angle away from the O-point of the mains voltage, one of the switches (a or b) being conductive for at least the entire half-cycle (FIGS. 5–7).

4. A light regulator as set forth in claim 1, characterized in that the second switch element (S2) is coupled between load (L) and the first switch element (S1).

Figure 9:
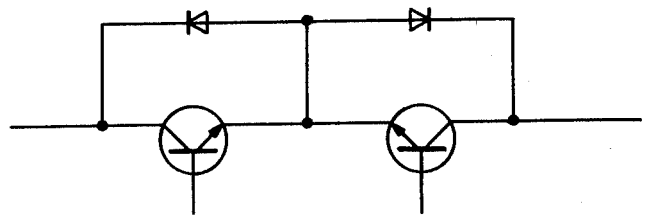
Figure 10:
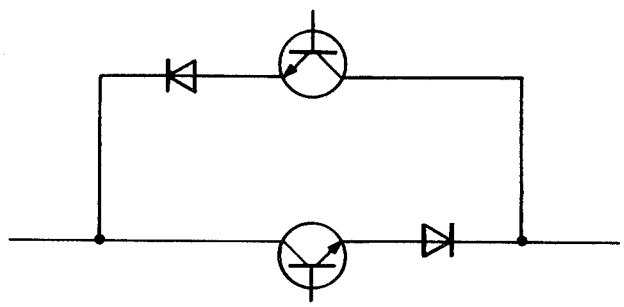
Figure 11:
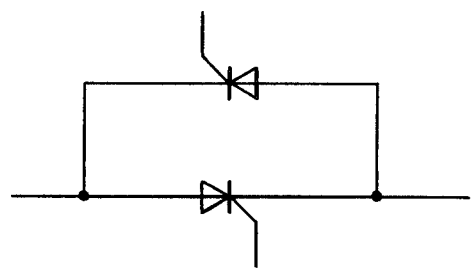
Figure 12:
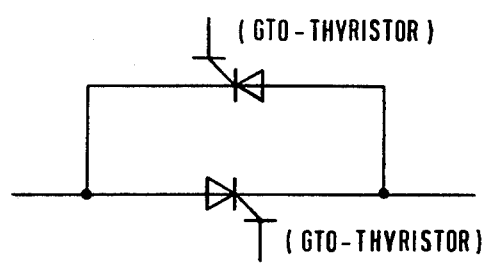

5. A light regulator as set forth in claim 1, characterized in that switch element (S1) and/or (S2) consists of two transistors (a and b) whose collectors or emitters are coupled together on the same cooling plate without insulation and that parallel to each transistor (FIG. 2, FIG. 9) or integrated in a transistor are coupled relatively oppositely directed diodes whose discharge direction is from the emitter of the parallel transistor to the collector thereof.

6. A light regulator as set forth in claim 5, characterized in that said transistors are integrated into one solid state component in which the collectors or emitters are together (e.g. FIG. 8).

7. A light regulator as set forth in claim 2, characterized by a current limiting circuit (5) coupled to said control logic circuit (4) and which, when the loading current of switch element (S1, S2) exceeds a permitted value, cuts the switch elements off of the control unit at least the next O-moment of the mains voltage.

8. A light regulator as set forth in claim 1 or 2, characterized in that switch elements (S1, S2) are so controlled that their control current, e.g. the base current of transistors, is increased as the loading current increases.

* * * * *